United States Patent

Matheny

[19]

[11] Patent Number: 6,108,682
[45] Date of Patent: Aug. 22, 2000

[54] DIVISION AND/OR SQUARE ROOT CALCULATING CIRCUIT

[75] Inventor: David Terrence Matheny, Austin, Tex.

[73] Assignee: ARM Limited, Cambridge, United Kingdom

[21] Appl. No.: 09/078,722

[22] Filed: May 14, 1998

[51] Int. Cl.[7] .............................. G06F 7/52; G06F 7/552
[52] U.S. Cl. .......................................... 708/656; 708/605
[58] Field of Search ...................................... 708/656, 605

[56] References Cited

U.S. PATENT DOCUMENTS

| | | | |
|---|---|---|---|
| 3,591,787 | 7/1971 | Freiman et al. | 235/156 |
| 3,736,413 | 5/1973 | Ferguson | 235/156 |
| 5,696,712 | 12/1997 | Prabhu et al. | 708/656 |
| 5,818,745 | 10/1998 | Sheaffer | 708/656 |
| 5,870,323 | 2/1999 | Prabhu et al. | 708/656 |

OTHER PUBLICATIONS

L.B. Bushard, IEEE Transactions On Computers, vol. C–32, No. 6, Jun. 1983 "A Minimum Table Size Result for Higher Radix Nonrestoring Division" pp. 521–526.

*Primary Examiner*—David H. Malzahn
*Attorney, Agent, or Firm*—Nixon & Vanderhye P.C.

[57] ABSTRACT

An iterative division and/or iterative square root circuit 20 uses quotient digits $q_{j+1}$ within the calculation that are dependent upon the input divisor D or radicand A and current partial remainder or partial radicand $P_j$ for the cycle reached. As the input divisor D or radicand A is fixed throughout the calculation, the critical path through the iterative circuit may be speeded up by preselecting and storing a subset QC of quotient digit values using a primary quotient digit selecting circuit 18, 22 operating in dependence upon the divisor D or radicand A and independently of the partial remainder or partial radicand $P_j$. Within the iterative circuit 20, the quotient digits $q_{j+1}$ to be used for each cycle can then be selected from this subset QC by a secondary quotient digit selecting circuit 24 in dependence upon the partial remainder or partial radicand $P_j$ and independent of the divisor D or radicand A.

21 Claims, 7 Drawing Sheets

DIVISION AND/OR SQUARE ROOT CALCULATING CIRCUIT

BACKGROUND OF THE INVENTION

1. Field of the Invention

This invention relates to the field of data processing. More particularly, this invention relates to data processing systems that incorporate special purpose circuits for performing division and/or square root operations.

2. Description of the Prior Art

It is known to provide special purpose division and/or square root performing circuits that operate upon an iterative basis. Examples of such systems are described in U.S. Pat. No. 4,939,686; "Algorithm for High Speed Shared Radix 4 Division and Radix 4 Square Root" by Jan Fandrianto, pages 73 to 79 of Proceeding of 8th Symposium on Computer Arithmetic, May 19–21 1987, Villa Olmo, Como, Italy; and "Radix-4 Square Root Without Initial PLA" by Milos D Ercegovac and Tomas Lang, pages 162 to 168 of Proceeding of 9th Symposium on Computer Arithmetic, Sep. 6–8 1989, Santa Monica, Calif., United States of America. These documents are incorporated herein by reference.

Figure 1:
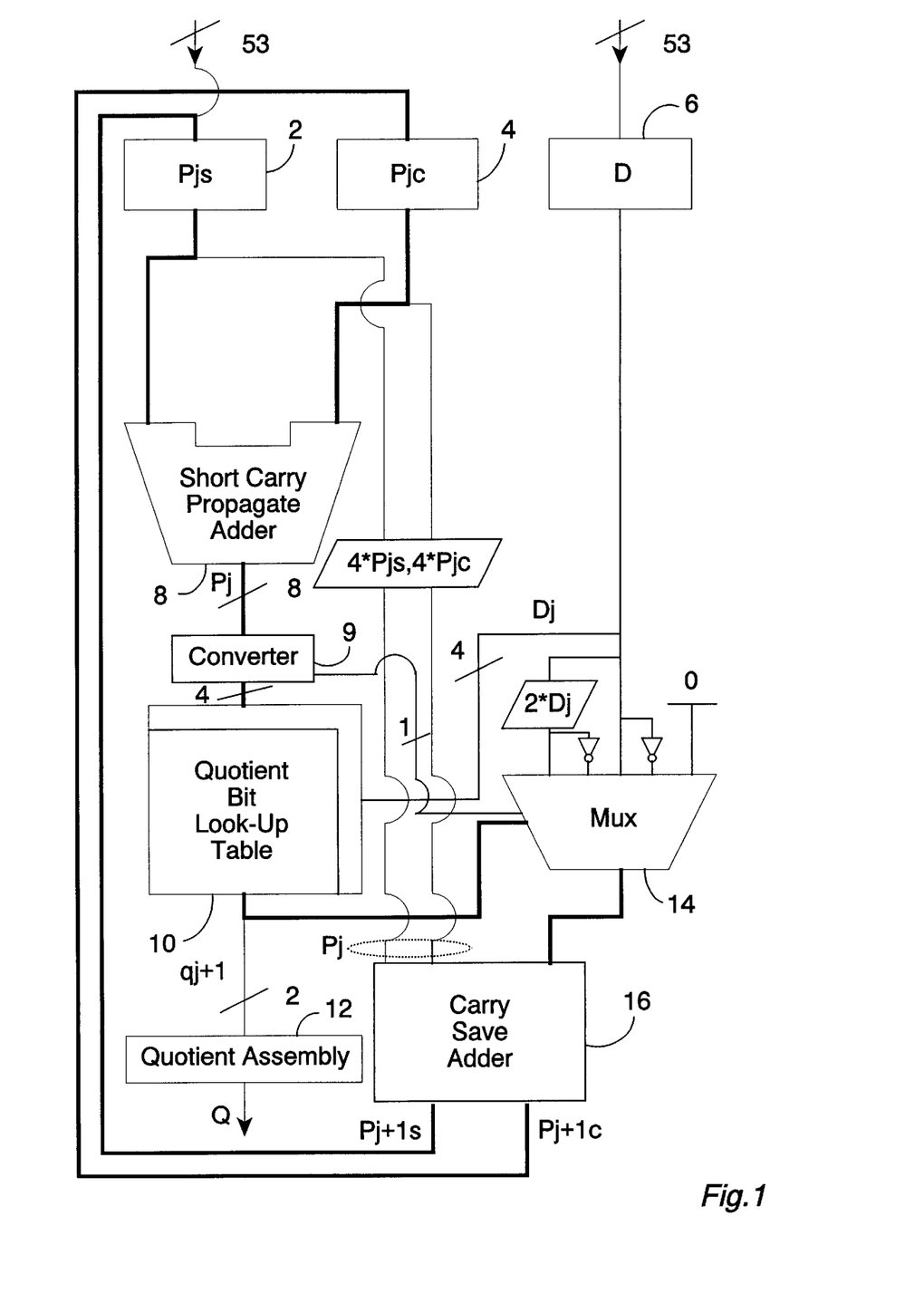
FIG. 1 illustrates an iterative division circuit using a quotient bit look-up table within the critical path.

An example of an iterative division circuit is shown in FIG. 1 of the accompanying drawings. In this example, at initialisation the dividend A is loaded into a save register 2. A carry register 4 is initialised to a value of zero. The divisor D is loaded into a divisor register 6. A carry propagate adder 8 serves to calculate the most significant 8 bits of the sum of the values stored within the save register 2 and the carry register 4. These 8 bits represent an estimate of the partial remainder $P_j$ (at initialization this is the dividend A) and are converted to a 4 bit magnitude and a 1 bit sign in a converter 9. The 4 bit magnitude is used as one input to a quotient bit look-up table 10. The 1 bit sign is one input to a multiplexer 14. Another input to the quotient bit look-up table 10 is the most significant 4 bits (excluding any sign or hidden bits) of divisor D from the divisor register 6.

The two inputs to the quotient bit look-up table 10 together point to a 2 bit quotient digit value $q_{j+1}$ that is supplied to a quotient assembly circuit 12 and a multiplexer 14. The 2 bit quotient digit value $q_{j+1}$ along with the 1 bit sign output from the converter 9 indicate how many times the divisor D subject to the radix in use (in this example r is 4) can be added to four times the partial remainder $P_j$ (denoted by $4*P_{js}$, $4*P_{jc}$) such that the result remains within a restricted range dependent upon the radix r and the redundancy choosen (in this example 2/3). The quotient digit value $q_{j+1}$ thus represents in redundent form (indirectly) two bits of the desired quotient result Q at the current bit position within the iterative operation. Having determined from the look-up table 10 the number of times the divisor D goes into the current partial remainder $P_j$, a new partial remainder $P_{j+1}$ must be calculated for use in subsequent iterative cycles. This may achieved by subtracting either 0, ± one times the divisor D or ± two times the divisor D from four times the current partial remainder $P_j$. One of these five possible values to add to the partial remainder $P_j$ is selected by the multiplexer 14 in dependence upon the quotient digit value $q_{j+1}$ and the sign bit and supplied to a carry save adder 16 together with a carry save representation of the current partial remainder $(P_{jc}, P_{js})$ from the sum register 2 and the carry register 4. The output from the carry save adder 16 is the new partial remainder $P_{j+1}$ (which in carry save form is $P_{j+1c}, P_{j+1s}$) that is saved back into the save register 2 and the carry register 4. The process then continues to calculate the next two bits of the quotient result until the entire quotient result has been assembled and is ready for output as a full quotient value Q.

It will be appreciated that the operation of the circuit illustrated in FIG. 1 is similar to the manner in which a person would perform a manual long division using pencil and paper, i.e. at each stage determining how many times the divisor goes into the current remainder, using that number as a digit of the quotient being calculated and then subtracting that number multiplied by the divisor from the partial remainder to produce a new partial remainder.

The critical path through the circuit of FIG. 1 is marked by the thick signal lines shown. More particularly, the critical path is through the save and carry registers 2, 4, the carry propagate adder 8, the converter 9, the quotient bit look-up table 10, the multiplexer 14, the carry save adder 16 and back to the save and carry registers 2, 4. This critical path determines how quickly the circuit can operate to calculate each two bits of the desired quotient result Q. If 56 bits of quotient are required for the fill quotient result Q, then it will be necessary for the circuit of FIG. 1 to iterate 28 times with this critical path being passed through 28 times.

SUMMARY OF THE INVENTION

It is an object of the present invention to provide a division circuit and/or square root circuit that operates to produce the final quotient output value more quickly. It is a constant and highly desirable aim within data processing to complete operations more quickly as this increases the maximum data processing capacity of the system and reduces interrupt latency.

Viewed from one aspect the present invention provides an apparatus for dividing a dividend A by a divisor D to generate a quotient Q, said apparatus comprising:

(i) an iterative division circuit for calculating upon each iteration a partial remainder given by:

$$P_{j+1} = rP_j - q_{j+1}D,$$

where
$P_{j+1}$ is the partial remainder after j+1 iterations;
r is the radix;
$P_j$ is the partial remainder after j iterations;
D is said divisor;
$q_{j+1}$ are quotient digits that are dependent upon $P_j$ and D; and
$P_j$ when j=0 is said dividend A;

(ii) a primary quotient digit selecting circuit for selecting and storing a subset of quotient digits $q_{j+1}$ in dependence upon D and independently of $P_j$; and (iii) a secondary quotient digit selecting circuit operating upon each iteration to select said quotient digits $q_{j+1}$ for use by said iterative division circuit from among said stored subset of quotient digits $q_{j+1}$ in dependence upon $P_j$ and independently of D.

The invention recognises that whilst the quotient digit values $q_{j+1}$ read from the quotient bit look-up table 10 are dependent upon both the current partial remainder $P_j$ and the divisor D, the divisor D remains constant throughout the calculation of an entire quotient result Q. Accordingly, only a small subset of the quotient digit values $q_{j+1}$ within the quotient bit look-up table 10 is accessed during calculation of a given quotient. This may be exploited to speed up the critical path by preselecting the subset of quotient digit values $q_{j+1}$ for the calculation being performed in dependence upon the divisor D and then selecting the individual quotient digit values $q_{j+1}$ in dependence upon the partial remainder $P_j$ from within this subset at each iterative stage. Only needing to provide access to a smaller number of quotient digit values $q_{j+1}$ allows a faster circuit element to be more easily used for this function thus speeding up the critical path at the sole expense of having to make the initial preselection step. In practice, since the iterative nature of the circuit is such that the critical path is passed through many times for a given calculation, only a relatively small gain in speed per cycle need be made to more than compensate for the additional preselection operation and achieve an overall significant increase in the speed with which the final result can be produced.

Whilst the preselection operation could be accommodated in a number of ways, e.g. by lengthening the first iterative cycle, in preferred embodiments of the invention said apparatus comprises a plurality of pipelined stages with said primary quotient digit selecting circuit being at least partially disposed in a pipeline stage upstream of said iterative division circuit and said secondary quotient digit selecting circuit.

Pipelining is a useful technique within such circuits in order to increase the efficiency of use of the resources available. Within such an environment, the additional stage of preselecting a subset of quotient digits can be achieved in an upstream stage of the pipeline so as to be ready for use by the secondary quotient digit selecting circuit and iterative division circuit without incurring any additional delay.

The primary quotient digit selecting circuit could be in many different form (e.g. a ROM addressed by the relevant bits of the divisor D), but in preferred embodiments said primary quotient digit selecting circuit comprises a programmable logic array that generates a plurality of quotient digits $q_{j+1}$ in dependence upon a field of high order bits of said divisor D.

A programmable logic array is a quick way of generating the required subset of quotient digits without requiring a large amount of circuit area. In a similar manner, the secondary quotient bit selecting circuit could have many forms (e.g. a barrel shifter with a shift amount controlled by the partial remainder $P_j$ and from which the desired quotient digits are read as the LSBs or MSBs of the shifted result), but in preferred embodiments the primary quotient digit selecting circuit stores the subset of quotient digit values $q_{j+1}$ within a quotient digit register from where they are selected by the secondary quotient digit selecting circuit using a multiplexer controlled by the partial remainder $P_j$.

Special purpose division circuits are often found within floating point units or integer units. Within this environment it is efficient if the iterative division circuit shares an adder and a shifter that are used by other floating point operations.

Viewed from a complementary aspect the present invention provides an apparatus for calculating the root Q of a radicand A, said apparatus comprising:
(i) an iterative square root circuit for calculating upon each iteration a partial radicand given by:

$$P_{j+1}=rP_j-q_{j+1}[2Q_j-q_{j+1}4^{-(j+1)}],$$

where
$P_{j+1}$ is the partial radicand after j+1 iterations;
r is the radix;
$P_j$ is the partial radicand after j iterations;
$Q_j$ is the partially developed root after j iterations;
$q_{j+1}$ are quotient digits that are dependent upon $P_j$ and A; and
when j=0, $P_j$ is said radicand A;
(ii) a primary quotient digit selecting circuit for selecting and storing a subset of quotient digits $q_{j+1}$ in dependence upon A and independently of $P_j$; and (iii) a secondary quotient digit selecting circuit operating upon each iteration to select said quotient digits $q_{j+1}$ for use by said iterative square root circuit from among said stored subset of quotient digits $q_{j+1}$ in dependence upon $P_j$ and independently of A.

As will be appreciated an iterative square root circuit operates in a manner that is analogous to the iterative division circuit discussed above and can also benefit from the use of this invention to speed up the critical path.

Viewed from another aspect the invention provides a method of dividing a dividend A by a divisor D to generate a quotient Q using an iterative division technique that calculates upon each iteration a partial remainder given by:

$$P_{j+1}=rP_j-q_{j+1}D,$$

where
$P_{j+1}$ is the partial remainder after j+1 iterations;
r is the radix;
$P_j$ is the partial remainder after j iterations;
D is said divisor;
$q_{j+1}$ are quotient digits that are dependent upon $P_j$ and D; and
$P_j$ when j=0 is said dividend A;
said method comprising the steps of:
(i) selecting and storing a subset of quotient digits $q_{j+1}$ in dependence upon D and independently of $P_j$;
(ii) selecting upon each iteration quotient digits $q_{j+1}$ for use in that iterative division cycle from among said stored subset of quotient digits $q_{j+1}$ in dependence upon $P_j$ and independently of D;
(iii) calculating said partial remainder $P_{j+1}$ using said quotient digits $q_{j+1}$; and
(iv) repeating step (ii) and (iii) to calculate said quotient Q.

Viewed from a further aspect the invention provides a method of calculating the root Q of a radicand A using an iterative square root technique that calculates upon each iteration a partial radicand given by:

$$P_{j+1}=rP_j-q_{j+1}[2Q_j-q_{j+1}4^{-(j+1)}],$$

where
$P_{j+1}$ is the partial radicand after j+1 iterations;
r is the radix;
$P_j$ is the partial radicand after j iterations;
$Q_j$ is the partially developed root after j iterations;
$q_{j+1}$ are quotient digits that are dependent upon P, and A; and
when j=0, $P_j$ is said radicand A;
said method comprising the steps of:
(i) selecting and storing a subset of quotient digits $q_{j+1}$ in dependence upon A and independently of $P_j$;
(ii) selecting upon each iteration quotient digits $q_{j+1}$ for use in that iterative division cycle from among said stored subset of quotient digits $q_{j+1}$ in dependence upon $P_j$ and independently of A;
(iii) calculating said partial radicand $P_{j+1}$ using said quotient digits $q_{j+1}$ and
(iv) repeating step (ii) and (iii) to calculate said root Q.

It will be appreciated that the equations given above defining the manner in which the partial remainder and partial radicand are calculated may be expressed in different manners which are equivalent to the forms given and are encompassed within the scope of the present invention.

BRIEF DESCRIPTION OF THE DRAWINGS

The present invention will be described further, by way of example only, with reference to preferred embodiments thereof as illustrated in the accompanying drawings, in which.

DESCRIPTION OF PREFERRED EMBODIMENTS

Figure 2:
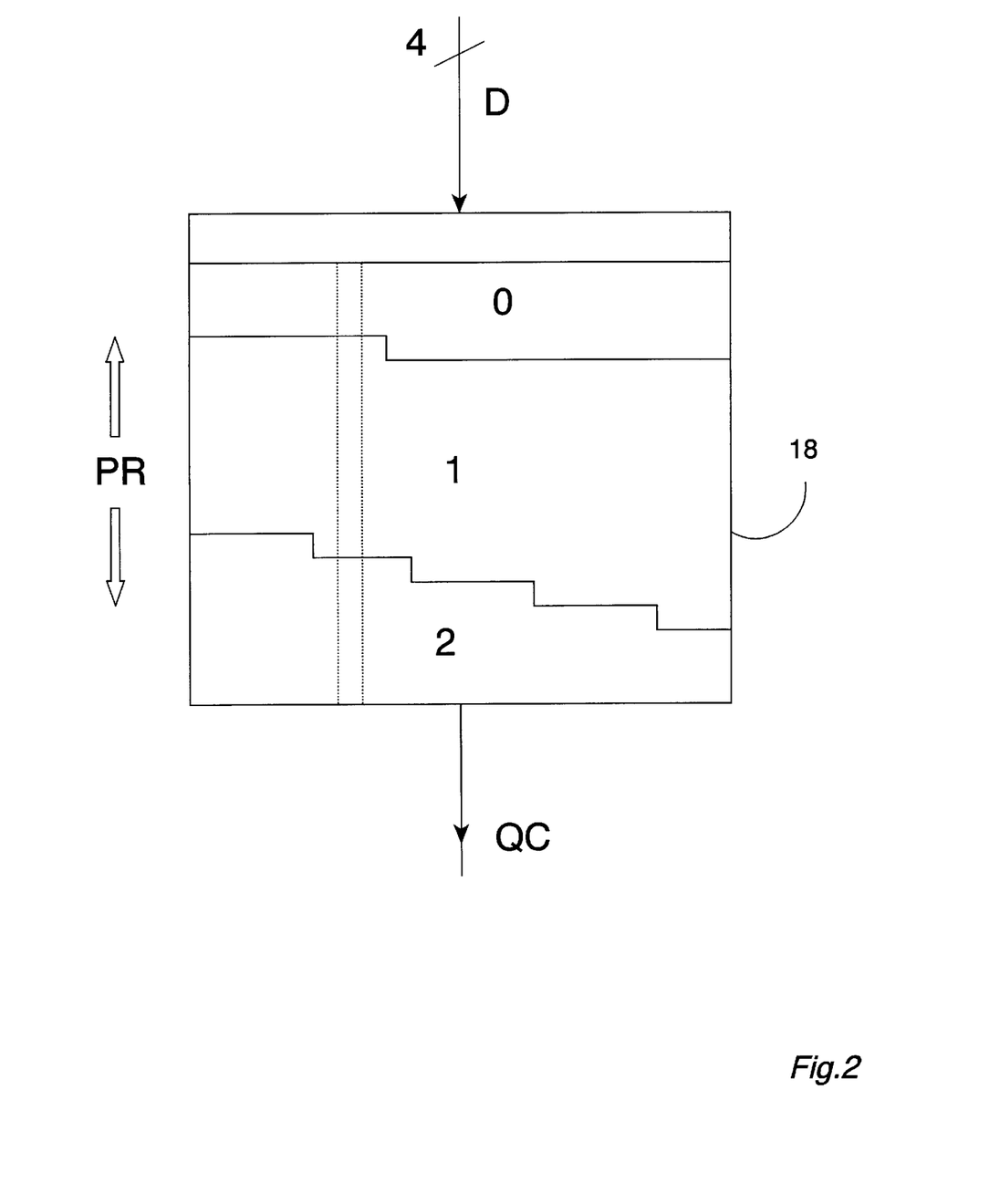
FIG. 2 illustrates a look-up table for an iterative division circuit that can be used to select a subset of quotient values $q_{j+1}$ in dependence upon a divisor D.

FIG. 2 illustrates a programmable logic array 18 that is used to select a subset of quotient digit values $q_{j+1}$ in dependence upon the most significant 4 bits of the mantissa of the divisor D, excluding the sign bit, and independently of the partial remainder $P_j$. This subset of quotient digit values $q_{j+1}$ is formed of a sequence of 13 2bit values that each indicate for the given divisor value D how many times that divisor value goes into each respective possible partial remainder value PR. The subset can be considered to represent a column of quotient values QC from within the table schematically illustrated. As the partial remainder value PR increases upon moving down the table for a given value of the divisor D, the number of times that the divisor goes into the partial remainder increases from 0 through to 2.

The programmable logic array 18 illustrated in FIG. 2 forms part of a primary quotient digit selecting circuit and can be provided at many different points within the overall circuit. It could be provided within the iterative division circuit portion or separately. If, as is the case in the embodiment of FIG. 3, the programmable logic array 18 is provided outside of the iterative division circuit, then the subset of quotient values QC generated will be stored within the iterative division circuit so as to be accessible to the secondary quotient digit selecting circuit. In this case, the storage element for the quotient values QC and the programmable logic array 18 together form the primary quotient digit selecting circuit.

Figure 3:
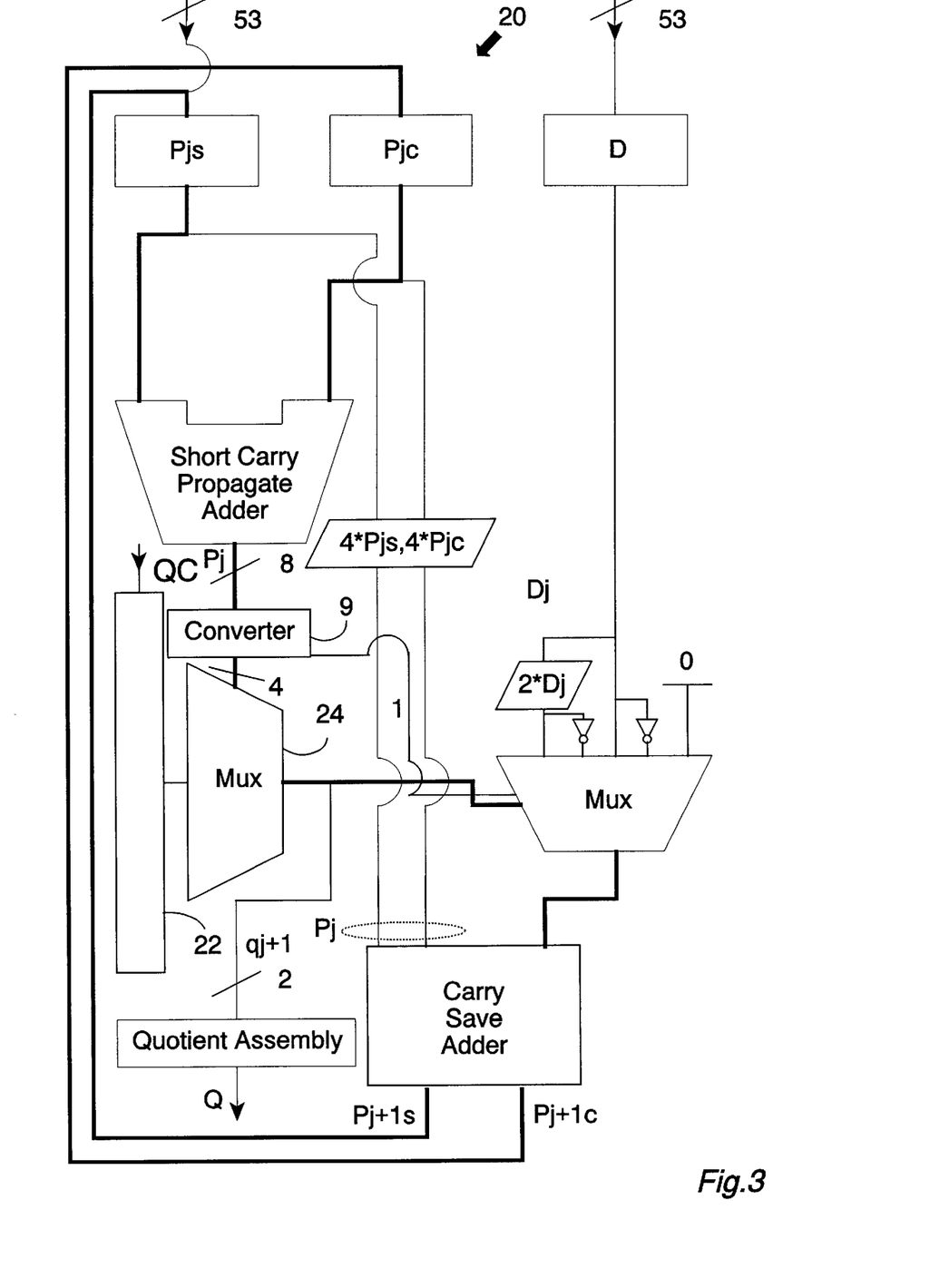
FIG. 3 illustrates an iterative division circuit in accordance with one example embodiment of the invention.

FIG. 3 shows an iterative division circuit 20 that is a modified version of the circuit of FIG. 1. The programmable logic array 18 of FIG. 2 passes the selected subset of quotient digit values QC to a quotient digit register 22. This storage operation takes place before the iterative division operation commences. A multiplexer 24 switched by the most significant 4 bits of the partial remainder $P_j$ in magnitude form selects the appropriate 2-bit quotient digits $q_{j+1}$ for use. The speed with which the multiplexer 24 is able to select values from within the quotient digit register 22 is significantly faster that at which the look-up table 10 of FIG. 1 is able to operate. By way of example, in FIG. 1, the time taken by the relatively slow look-up table may be approximately 40% of the total critical path time (see for example Division and Square Root Digit-Recurrence Algorithms and Implementations by Milos D Ercegovac and Tomas Lang pages 190 to 193). The arrangement of FIG. 3 operates twice as quickly resulting in an approximate 20% reduction in the original critical path time. If the full calculation involves 28 iterations plus the preselection cycle then this saves the equivalent of 4.8 cycle times over the full calculation. This more than compensates for the extra preselection stage performed by the programmable logic array 18.

Apart from the manner in which the quotient digits $q_{j+1}$ are selected, the circuit of FIG. 3 operates in a similar manner to that of FIG. 1.

Figure 4:
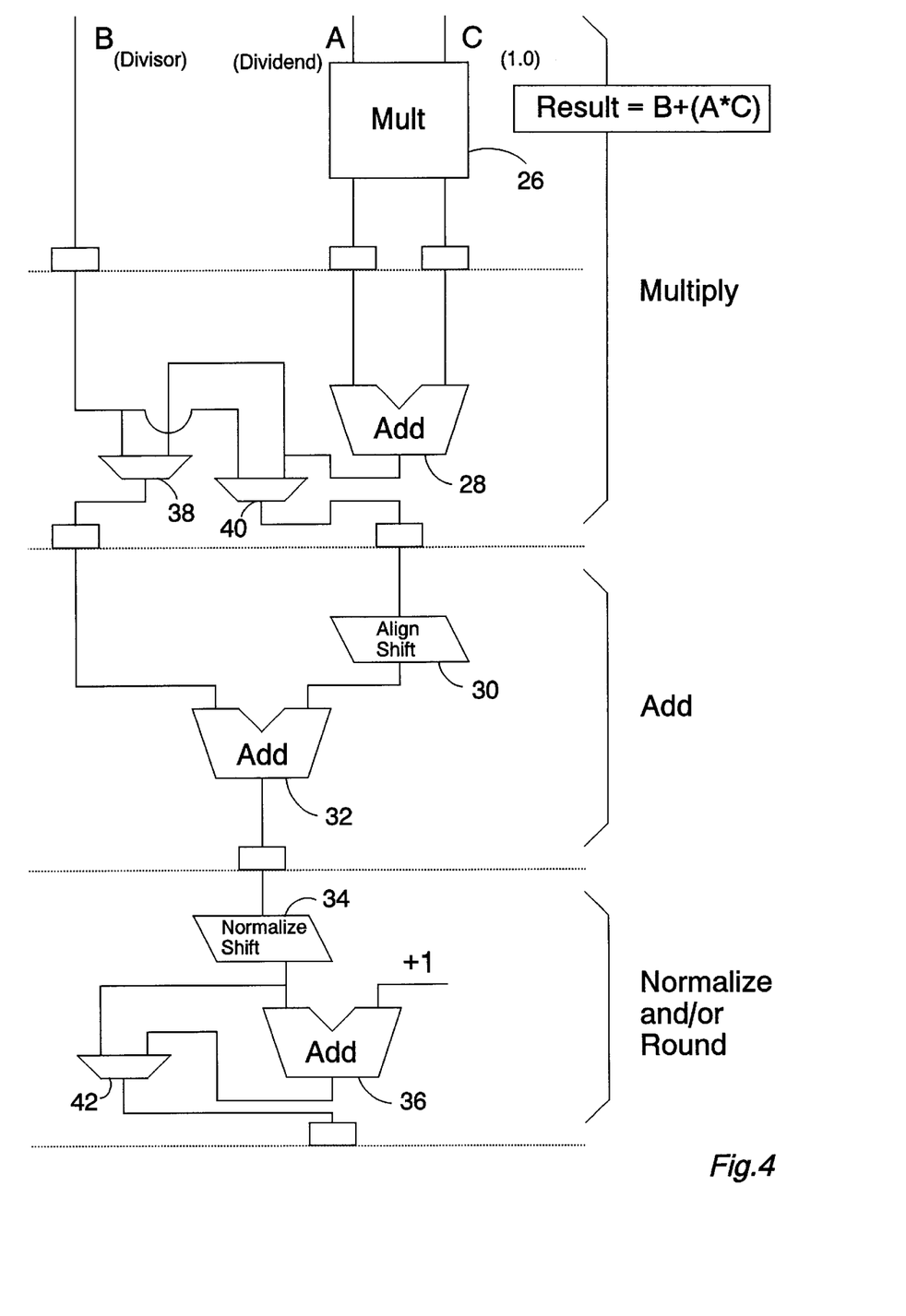
FIG. 4 illustrates the mantissa portion of a pipelined floating point unit for performing a multiply-accumulate operation.

FIG. 4 shows the mantissa path within a floating-point unit that performs a multiply-accumulate operation B+(A*C). The floating-point unit is pipelined with a two stage multiply using a multiplier 26 and an adder 28, followed by an add stage using an alignment shifter 30 and an adder 32 followed by a normalize and/or round stage using a normalization shifter 34 and an adder 36. Multiplexers 38, 40 are provided to swap over the operands if desired and a multiplexer 42 allows the rounding stage adder to be by-passed if desired.

When performing a divide operation, the divisor is input as operand B, the dividend A as operand A and the operand C is supplied with a value of 1.0 such that the multiplier 26 will pass the dividend A unaltered.

Figure 5:
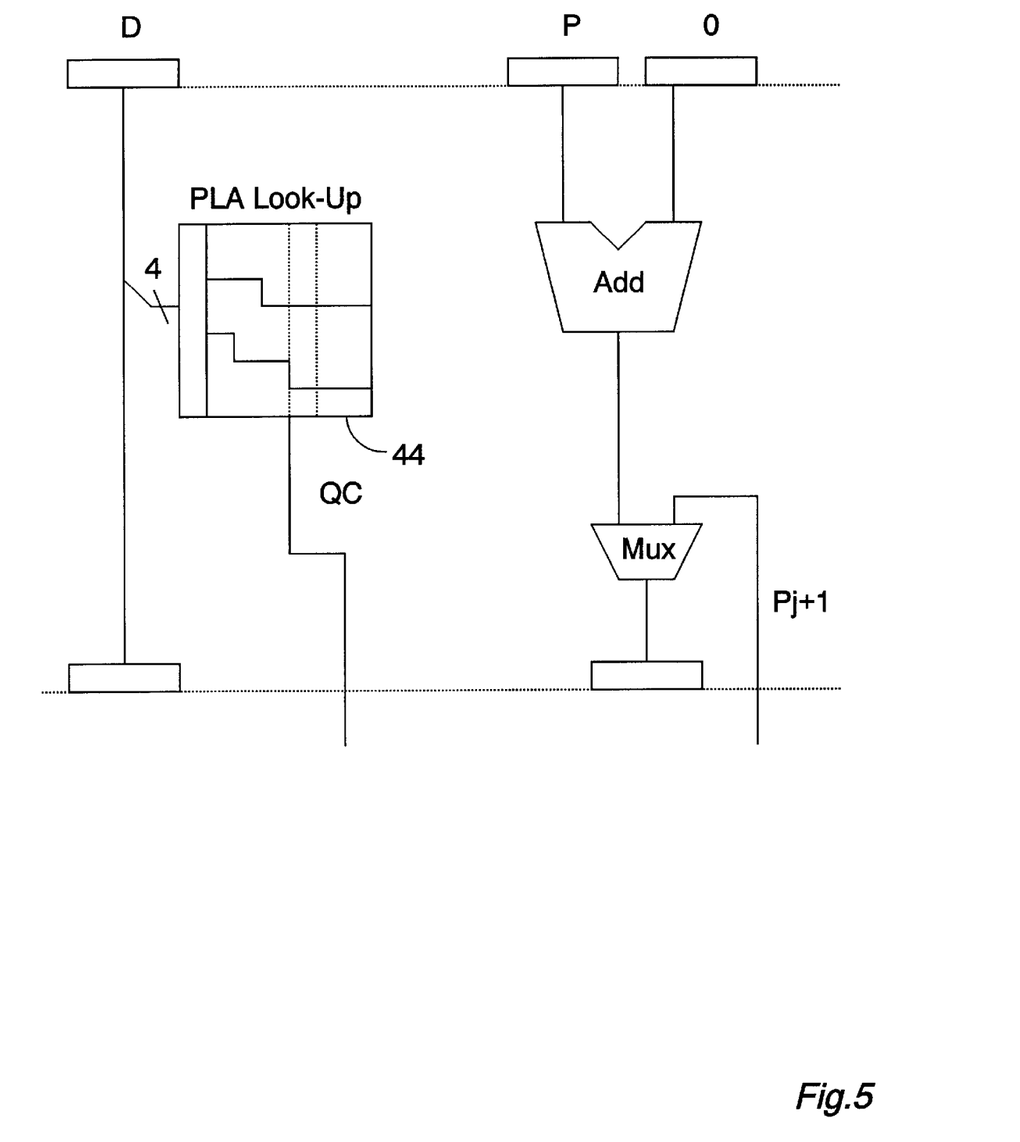
FIG. 5 illustrates how the second multiply stage of the pipeline of FIG. 4 may be modified to provide a primary quotient digit selected circuit in accordance with a second example embodiment of the invention.

FIG. 5 shows the way in which the second multiply stage may be modified to include a programmable logic array 44 that operates to select a subset of quotient digit values QC as part of the primary quotient digit selecting circuit.

Figure 6:
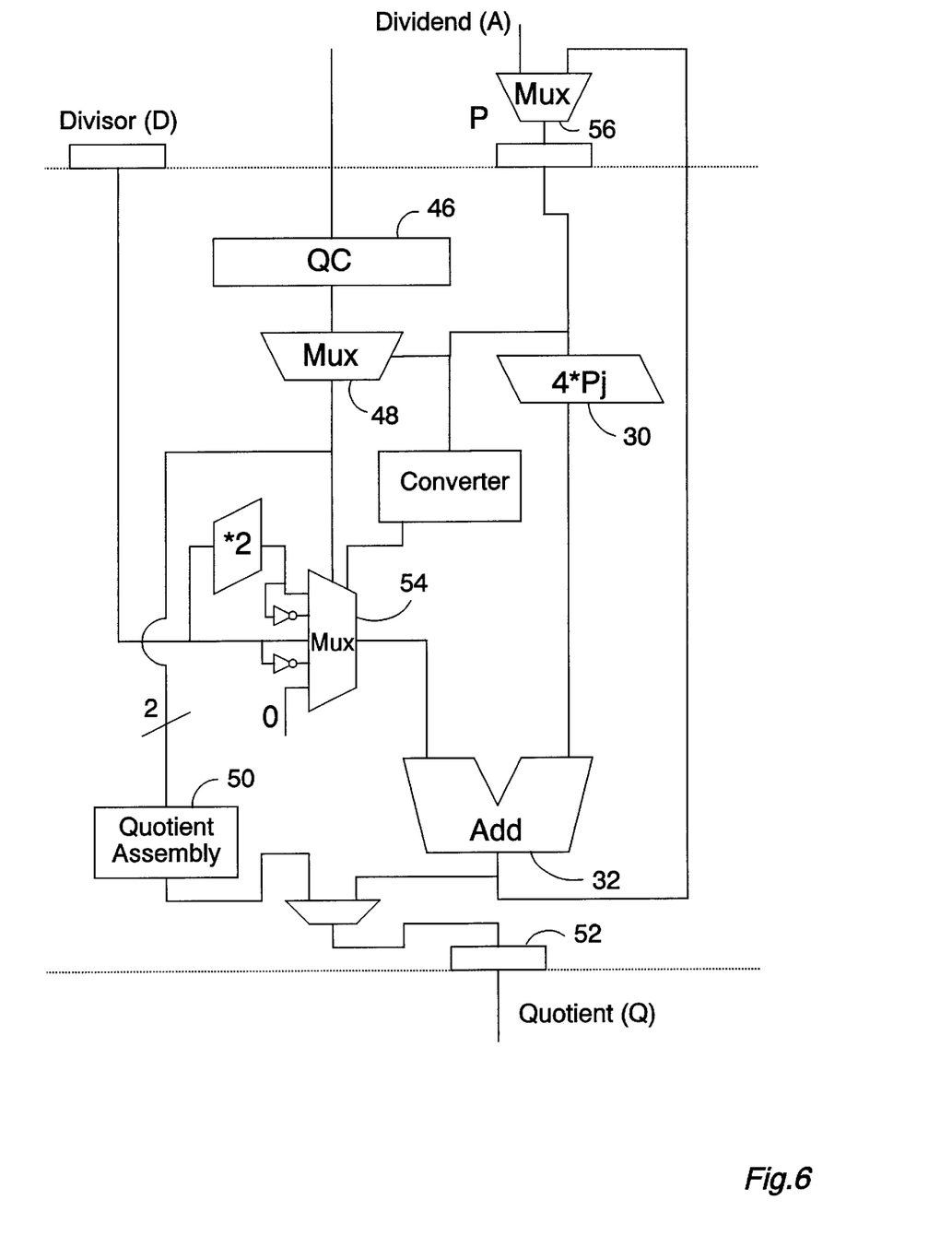
FIG. 6 illustrates how the add stage of the pipeline of FIG. 4 may be modified to provide an iterative division operation in accordance with said second example embodiment the invention.

FIG. 6 shows the modifications to the add stage to provide an iterative division circuit. The subset of quotient values QC from the programmable logic array 44 are stored within a quotient digit register 46. A multiplexer 48 responsive to a field of the most significant bits of the partial remainder $P_j$ selects the quotient digits $q_{j+1}$ for each cycle that are then passed to a quotient assembly circuit 50 from which they pass to the existing stage output latch 52. The quotient digits $q_{j+1}$ also serve via a multiplexer 54 and the adder 32 to provide the required updating of the partial remainder $P_j$ to its new value $P_{j+1}$ prior to this being recirculated via a multiplexer 56. The alignment shifter 30 is reused in conjunction with the adder 32 to provide the updated partial remainder $P_{j+1}$.

Figure 7:
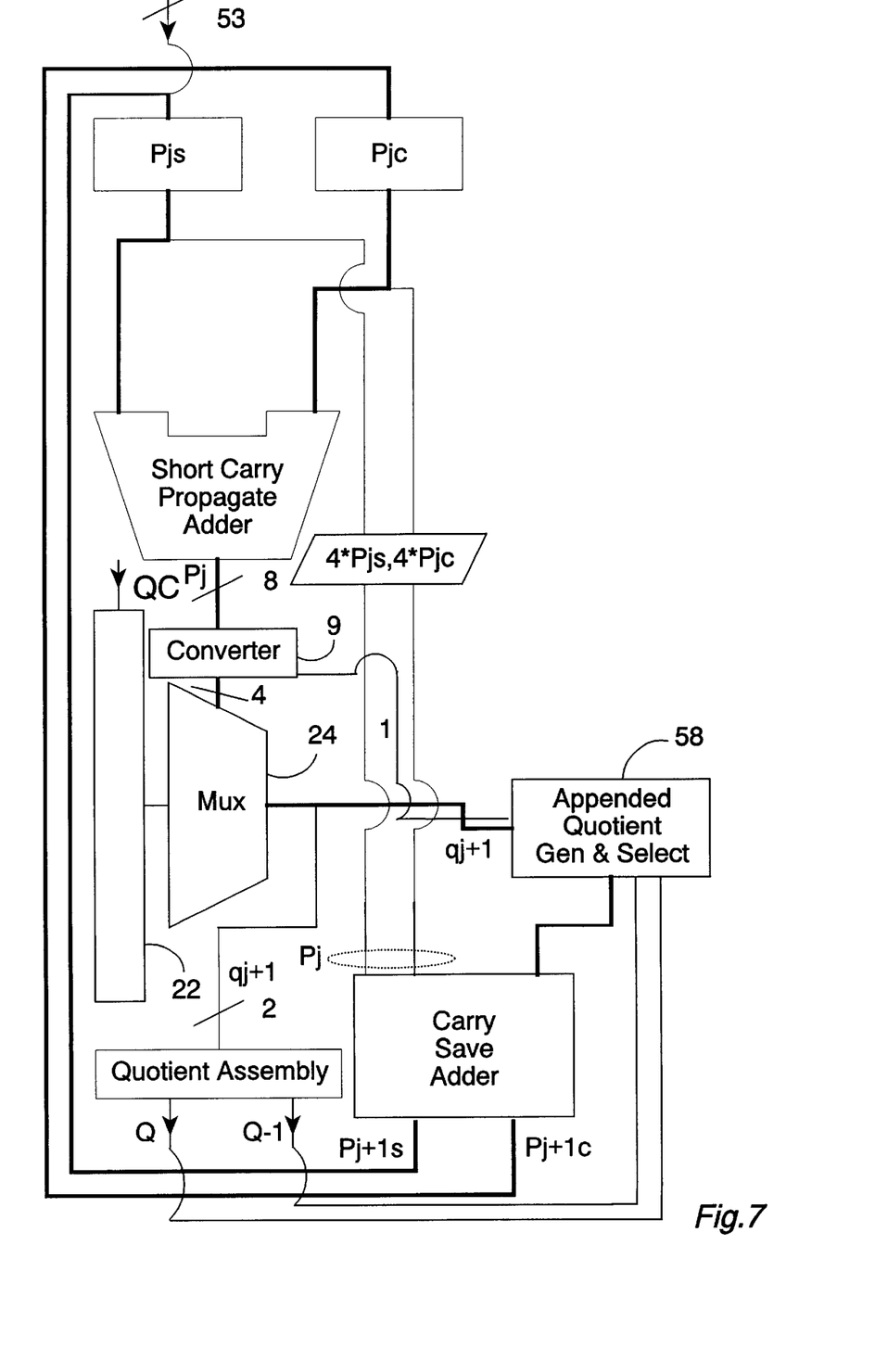
FIG. 7 illustrates an iterative square root calculating circuit in accordance with a third example embodiment of the invention.

FIG. 7 illustrates an iterative square root circuit based upon the circuit of FIG. 3. The quotient digit register 22 and multiplexer 24 operate in a similar manner (possibly with the addition of a PLA for estimating an initial root value) with different quotient digit values $q_{j+1}$ and the multiplexer being switched by the partial radicand $P_j$ rather than the partial remainder. The principle of operation of such iterative square root circuit analogous to the division operation and is described within the references given in the introduction. In particular, it is convenient if values of the root Q and the root minus one Q–1 are maintained whilst the iterative processing continues as the value by which the partial radicand $P_j$ should be modified can be determined as one of either Q or Q–1 with different fixed appended values.

It will be understood that the functions of iterative division and square root may be provided together in the same apparatus as this increases the range of hardware supported mathematical operations. Furthermore, the invention may also be used to provide the remainder function required by the IEEE Standard 754-1985 Binary Floating Point Arithmetic.

Although particular embodiments of the invention have been described herewith, it will be apparent that the invention is not limited thereto, and that many modifications and additions may be made within the scope of the invention. For example, various combinations of the features of the following dependent claims could be made with the features of the independent claims without departing from the scope of the present invention.

I claim:

1. An apparatus for dividing a dividend A by a divisor D to generate a quotient Q, said apparatus comprising:

(i) an iterative division circuit for calculating upon each iteration a partial remainder given by:

$$P_{j+1} = rP_j - q_{j+1}D,$$

where
   $P_{j+1}$ is the partial remainder after j+1 iterations;
   r is the radix;
   $P_j$ is the partial remainder after j iterations;
   D is said divisor;
   $q_{j+1}$ are quotient digits that are dependent upon $P_j$ and D; and
   $P_j$ when j=0 is said dividend A;

(ii) a primary quotient digit selecting circuit for selecting and storing a subset of quotient digits $q_{j+1}$ in dependence upon D and independently of $P_j$, quotient digits $q_{j+1}$ supplied to said iterative division circuit being selected from said subset of quotient digits $q_{j+1}$; and (iii) a secondary quotient digit selecting circuit coupled to said primary quotient digit selecting circuit and said iterative division circuit and operating upon each iteration to select said quotient digits $q_{j+1}$ for use by said iterative division circuit from among said stored subset of quotient digits $q_{j+1}$ in dependence upon $P_j$ and independently of D.

2. An apparatus as claimed in claim 1, wherein said iterative division circuit, said primary quotient digit selecting circuit and said secondary quotient digit selecting circuit are arranged as a plurality of pipelined stages with said primary quotient digit selecting circuit being at least partially disposed in a pipeline stage upstream of said iterative division circuit and said secondary quotient digit selecting circuit.

3. An apparatus as claimed in claim 2, wherein said iterative division circuit and said primary quotient digit selecting circuit are disposed within the same pipeline stage.

4. An apparatus as claimed in claim 1, wherein said primary quotient digit selecting circuit comprises a programmable logic array that generates a plurality of quotient digits $q_{j+1}$ in dependence upon a field of high order bits of said divisor D.

5. An apparatus as claimed in claim 1, wherein said primary quotient digit selecting circuit stores said subset of quotient digits $q_{j+1}$ within a quotient digit register.

6. An apparatus as claimed in claim 5, wherein said secondary quotient digit selecting circuit selects said quotient digits $q_{j+1}$ from said quotient digit register with a multiplexer controlled by $P_j$.

7. A floating point arithmetic unit including an apparatus for dividing as claimed in claim 1, wherein said iterative division circuit shares an adder and shifter with other floating point operations that are performed by said floating point unit.

8. A floating point arithmetic unit as claimed in claim 7, wherein said iterative division circuit is part of an add stage within said floating-point unit.

9. An integer arithmetic unit including an apparatus for dividing as claimed in claim 1.

10. An apparatus for calculating the root Q of a radicand A, said apparatus comprising:

an iterative square root circuit for calculating upon each iteration a partial radicand given by:

$$P_{j+1} = rP_j - q_{j+1}[2Q_j - q_{j+1}4^{-(j+1)}],$$

where
    $P_{j+1}$ is the partial radicand after j+1 iterations;
    r is the radix;
    $P_j$ is the partial radicand after j iterations;
    $Q_j$ is the partially developed root after j iterations;
    $q_{j+1}$ are quotient digits that are dependent upon $P_j$ and A; and
    when j=0, $P_j$ is said radicand A;

(ii) a primary quotient digit selecting circuit for selecting and storing a subset of quotient digits $q_{j+1}$ in dependence upon A and independently of $P_j$, quotient digits $q_{j+1}$ supplied to said iterative square root circuit being selected from said subset of quotient digits $q_{j+1}$; and (iii) a secondary quotient digit selecting circuit coupled to said primary quotient digit selecting circuit and said iterative division circuit and operating upon each iteration to select said quotient digits $q_{j+1}$ for use by said iterative square root circuit from among said stored subset of quotient digits $q_{j+1}$ in dependence upon $P_j$ and independently of A.

11. An apparatus as claimed in claim 10, wherein said iterative square root circuit, said primary quotient digit selecting circuit and said secondary quotient digit selecting circuit are arranged as a plurality of pipelined stages with said primary quotient digit selecting circuit and an initial root estimating circuit being at least partially disposed in a pipeline stage upstream of said iterative square root circuit and said secondary quotient digit selecting circuit.

12. An apparatus as claimed in claim 11, wherein said iterative square root circuit and said primary quotient digit selecting circuit are disposed within the same pipeline stage.

13. An apparatus as claimed in claim 10, wherein said primary quotient digit selecting circuit comprises a programmable logic array that generates a plurality of quotient digits $q_{j+1}$ in dependence upon a field of high order bits of said radicand A.

14. An apparatus as claimed in claim 10, wherein said primary quotient digit selecting circuit stores said subset of quotient digits $q_{j+1}$ within a quotient digit register.

15. An apparatus as claimed in claim 14, wherein said secondary quotient digit selecting circuit selects said quotient digits $q_{j+1}$ from said quotient digit register with a multiplexer controlled by $P_j$.

16. A floating point arithmetic unit including an apparatus for calculating as claimed in claim 10, wherein said iterative square root circuit shares an adder and shifter with other floating point operations that are performed by said floating point unit.

17. A floating point arithmetic unit as claimed in claim 16, wherein said iterative square root circuit is part of an add stage within said floating point unit.

18. An integer arithmetic unit including an apparatus for calculating as claimed in claim 10.

19. An apparatus as claimed in claim 10, further comprising apparatus for dividing a dividend A' by a divisor D to generation a quotient Q', said apparatus comprising:

(i) an iterative division circuit for calculating upon each iteration a partial remainder given by:

$$P'_{j+1}=r'P'_j-q'_{j+1}D,$$

where $P'_{j+1}$ is the partial remainder after j+1 iterations;
r' is the radix;
$P_j$ is the partial remainder after j iterations;
D is said divisor;
$q_{j+1}$ are division quotient digits that are dependent upon $P'_j$ and D; and
$P_j$ when j=0 is said dividend A';

(ii) a primary division quotient digit selecting circuit for selecting and storing a subset of quotient digits $q'_{j+1}$ in dependence upon D and independently of $P'_j$, division quotient digits $q_{j+1}$ supplied to said iterative division circuit being selected from said subset of division quotient digits $q_{j+1}$; and (iii) a secondary division quotient digit selecting circuit coupled to said primary division quotient digit selecting circuit and said iterative division circuit and operating upon each iteration to select said division quotient digits $q'_{j+1}$ for use by said iterative division circuit from among said stored subset of division quotient digits $q'_{j+1}$ in dependence upon $P'_j$ and independently of D.

20. A method of dividing a dividend A by a divisor D to generate a quotient Q using an iterative division technique that calculates upon each iteration a partial remainder given by:

$$P_{j+1}=rP_j-q_{j+1}D,$$

where $P_{j+1}$ is the partial remainder after j+1 iterations;
r is the radix;
$P_j$ is the partial remainder after j iterations;
D is said divisor;
$q_{j+1}$ are quotient digits that are dependent upon $P_j$ and D; and
$P_j$ when j=0 is said dividend A;

said method comprising the steps of:

(i) selecting and storing a subset of quotient digits $q_{j+1}$ in dependence upon D and independently of $P_j$;

(ii) selecting upon each iteration quotient digits $q_{j+1}$ for use in that iterative division cycle from among said stored subset of quotient digits $q_{j+1}$ in dependence upon $P_j$ and independently of D;

(iii) calculating said partial remainder $P_{j+1}$ using said quotient digits $q_{j+1}$; and (iv) repeating step (ii) and (iii) to calculate said quotient Q.

21. A method of calculating the root Q of a radicand A using an iterative square root technique that calculates upon each iteration a partial radicand given by:

$$P_{j+1}=rP_j-q_{j+1}[2Q_j-q_{j+1}4^{-(j+1)}],$$

where $P_{j+1}$ is the partial radicand after j+1 iterations;
r is the radix;
$P_j$ is the partial radicand after j iterations;
$Q_j$ is the partially developed root after j iterations;
$q_{j+1}$ are quotient digits that are dependent upon $P_j$ and A; and
when j=0, $P_j$ is said radicand A;

said method comprising the steps of:

(i) selecting and storing a subset of quotient digits $q_{j+1}$ in dependence upon A and independently of $P_j$;

(ii) selecting upon each iteration quotient digits $q_{j+1}$ for use in that iterative division cycle from among said stored subset of quotient digits $q_{j+1}$ in dependence upon $P_j$ and independently of A;

(iii) calculating said partial radicand $P_{j+1}$ using said quotient digits $q_{j+1}$; and (iv) repeating step (ii) and (iii) to calculate said root Q.

* * * * *